United States Patent [19]

Nogami et al.

[11] 4,211,312
[45] Jul. 8, 1980

[54] EMERGENCY BRAKE SYSTEM FOR VEHICLES

[75] Inventors: Takahiro Nogami, Mishima; Hidetoshi Shimizu, Susono; Mitsuyuki Horie, Susono; Yuji Yaji, Susono, all of Japan

[73] Assignee: Toyota Jidosha Kogyo Kabushiki Kaisha, Aichi, Japan

[21] Appl. No.: 928,865

[22] Filed: Jul. 28, 1978

[30] Foreign Application Priority Data

Aug. 2, 1977 [JP] Japan .................................. 52-92732

[51] Int. Cl.² ............................................. F02D 9/06
[52] U.S. Cl. .................................... 188/273; 123/320
[58] Field of Search ....................... 188/273, 359, 357; 303/85, 9; 60/280, 324; 123/97 B

[56] References Cited

U.S. PATENT DOCUMENTS

| 3,234,923 | 2/1966 | Fleck et al. ....................... 188/273 X |
| 3,947,073 | 3/1976 | Cattaneo et al. ................. 188/273 X |
| 4,149,618 | 4/1979 | Horie .................................... 188/273 |

Primary Examiner—Douglas C. Butler
Attorney, Agent, or Firm—Oblon, Fisher, Spivak, McClelland & Maier

[57] ABSTRACT

In an emergency brake system for a vehicle having a brake booster to increase braking pressure applied to wheel brake cylinders from a master cylinder, a cut-off valve is provided within an exhaust pipe of an internal combustion engine for the vehicle and operatively connected to a manual shift lever, and a selector valve is disposed within a communication passage connecting a servo-chamber of the brake booster to an upstream of the cut-off valve in such a manner that the servo-chamber is normally communicated to a source of pneumatic pressure in response to operation of the master cylinder. The cut-off valve is normally opened when the shift lever is in a first position and is closed upon shifting the lever to a second position from the first position to create back pressure acting on the engine. The selector valve is switched-over upon shifting the lever to the second position to apply the back pressure from the exhaust pipe into the servo-chamber through the communication passage.

4 Claims, 8 Drawing Figures

E## EMERGENCY BRAKE SYSTEM FOR VEHICLES

BACKGROUND OF THE INVENTION

The present invention relates to a vehicle braking system, and more particularly to an emergency brake system suitable for a vehicle equipped with a pneumatically operated brake booster.

A conventional brake booster of this kind comprises a servo-chamber and a power piston operated by pneumatic pressure applied to the servo-chamber from a source of pneumatic pressure in response to operation of a brake pedal. It is, however, observed that if the pneumatic pressure decreases due to damage of the pneumatic pressure source, the brake booster may not be operated. This means that sufficient braking effect cannot be obtained only by depression of the brake pedal.

SUMMARY OF THE INVENTION

Accordingly, in the present invention, there is provided an emergency brake system for a vehicle having a brake booster to increase braking pressure applied to wheel brake cylinders from a master cylinder, the brake booster including a servo-chamber and a power piston operated by pneumatic pressure applied to the servo-chamber from a source of pneumatic pressure in response to operation of the master cylinder, the system comprising:

a manual shift lever arranged to be normally held in a first position and emergently shifted to a second position from the first position;

a cut-off valve provided within an exhaust pipe of an internal combustion engine for the vehicle and operatively connected to the shift lever, the cut-off valve being normally opened when the shift lever is in the first position and being closed upon shifting of the shift lever to the second position from the first position to create back pressure acting on the engine;

a communication passage connecting the servo-chamber of the brake booster to an upstream of the cut-off valve; and a selector valve disposed within the communication passage to normally provide fluid communication between the pneumatic pressure source and the servo-chamber, the selector valve being switched-over upon shifting of the shift lever to the second position from the first position to apply the back pressure from the exhaust pipe into the servo-chamber through the communication passage.

BRIEF DESCRIPTION OF THE DRAWINGS

Additional objects and advantages of the present invention will be more readily apparent from the following detailed description of preferred embodiments thereof when taken together with the accompanying drawings in which.

DESCRIPTION OF THE PREFERRED EMBODIMENTS

Figure 1:
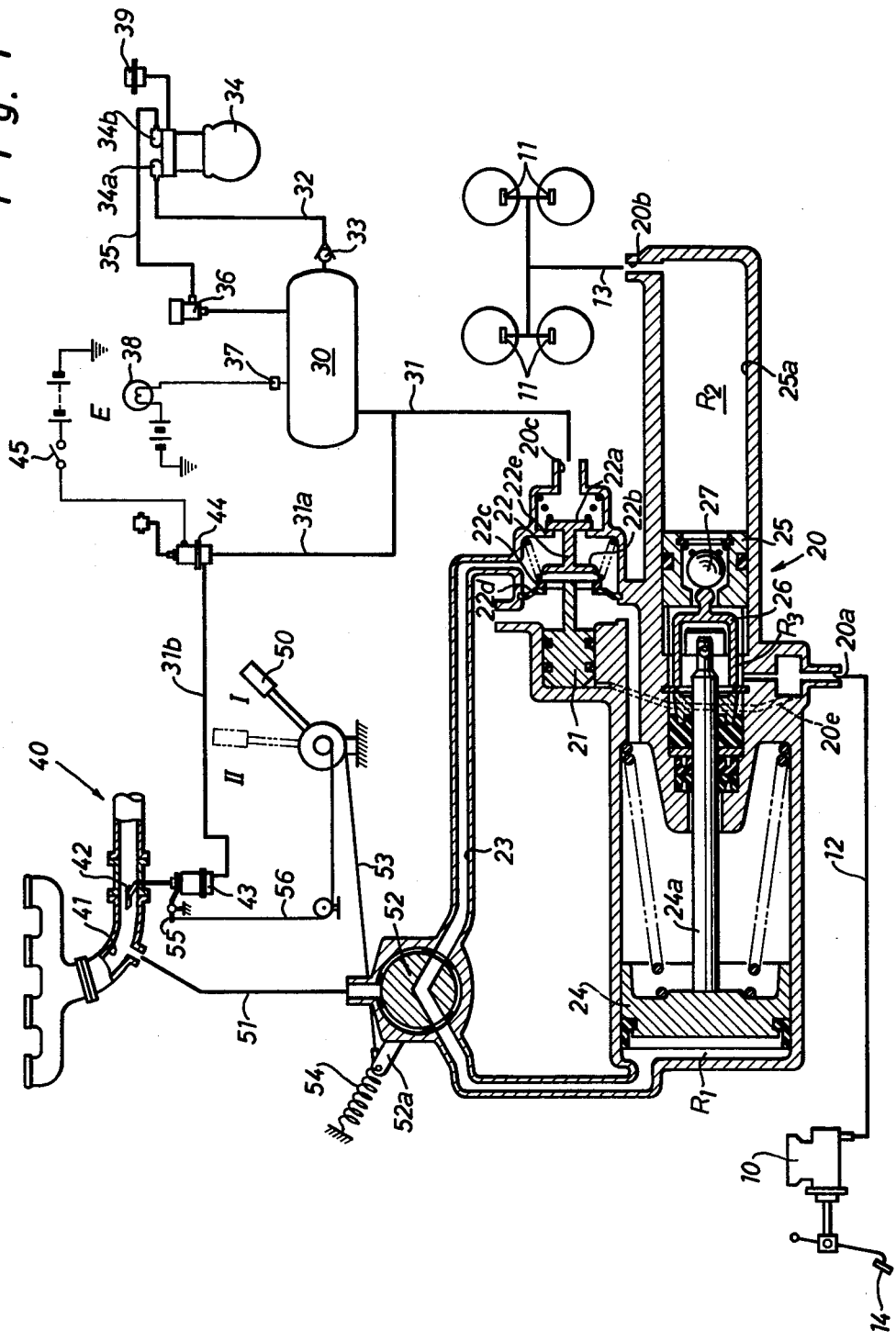
FIG. 1 illustrates a vehicle braking system including an air-servo mechanism in accordance with the present invention.

Referring now to the drawings, particularly to FIG. 1, there is illustrated a brake booster 20 in the form of an air-servo mechanism which is pneumatically actuated in response to hydraulic pressure applied therethrough from a master cylinder 10 to wheel brake cylinders 11. The brake booster 20 has a housing provided thereon with an inlet port 20a, an outlet port 20b and an air inlet port 20c. The inlet port 20a is connected to the master cylinder 10 by way of a conduit 12, the outlet port 20b is connected to the wheel brake cylinders 11 by way of a conduit 13, and the air inlet port 20c is connected to a pressure tank 30 by way of a conduit 31. The brake booster 20 is provided with a control piston 21 which is operated by hydraulic pressure applied thereto from the master cylinder 10 through a passage 20e opening into the inlet port 20a. The control piston 21 is connected to a valve seat 22c which is integral with a spring loaded diaphragm 22d. A spring loaded valve body 22 has a first valve part 22a co-operating with a valve seat 22e and a second valve part 22b co-operating with the valve seat 22c. The valve body 22 is normally engaged at its first valve part 22a with the valve seat 22e to interrupt air flow from the air inlet port 20c into a connecting pipe 23 and is separated at its second valve part 22b from the valve seat 22c to connect the pipe 23 with the atmospheric pressure. The connecting pipe 23 is connected into a servo-chamber $R_1$ by way of a selector valve 52.

The brake booster 20 comprises a spring loaded power piston 24 which is pneumatically operated by air pressure applied into the servo-chamber $R_1$ through the connecting pipe 23. The power piston 24 has a push-rod 24a extending into a stepped bore 25a through seal members and connected with an operating piston 25. The operating piston 25 is reciprocable within the stepped bore 25a and provides a pressure chamber $R_2$ in communication with the outlet port 20b and a pressure chamber $R_3$ in communication with the inlet port 20a. The operating piston 25 is also provided therein with a check valve 27 which is normally opened by a float member 26 to permit fluid communication between the pressure chambers $R_2$ and $R_3$.

The pressure tank 30 is connected to an outlet port 34a of an air pump 34 by way of a check valve 33 and a conduit 32 and is also connected to an inlet port 34b of the pump 34 by way of a pressure regulator 36 and a conduit 35. The air pump 34 is driven by the prime engine of the vehicle to suck the air therein through the inlet port 34b and an air cleaner 39. A pressure switch 37 is provided on the tank 30 to be activated when the pressure in tank 30 drops below a predetermined value. The pressure switch 37 is connected to a warning lamp 38 located near an operator's seat in the vehicle compartment. Thus, the warning lamp 38 is lighted by activation of the switch 37 to alarm to the operator that the brake booster 20 may not be operated.

An exhaust braking device 40 is provided to create back pressure in an exhaust pipe 41 thereby to cause engine braking operation. The exhaust braking device 40 comprises a cut-off valve 43 normally opened by a pneumatic actuator 43, a normally closed electrically operated selector valve 44, and a manual switch 45 located near the operator's seat. The selector valve 44 is opened when energized by electric energy supplied from a vehicle battery E upon closing the switch 45 and supplies compressed air from the pressure tank 30 to the actuator 43 through conduits 31a and 31b. Thus, the actuator 43 is activated by the compressed air from the tank 30 to close the cut-off valve 42, which is pivoted within the exhaust pipe 41.

The selector valve 52 within the connecting pipe 23 is arranged to selectively connect the pipe 23 to an upstream of the cut-off valve 42 by way of a conduit 51. The selector valve 52 has an arm 52a which is operatively connected to a manual shift lever 50 by means of a wire 53. The arm 52a is normally biased by a tension spring 54 in such a manner that the pipe 23 is isolated from the conduit 51 and opened toward the air inlet port 20c. The manual shift lever 50 is located near the operator's seat and is normally held in a first position (I) due to loading of the spring 54. When the shift lever 50 is shifted to a second position (II) to rotate the arm 52a clockwise, the selector valve 52 is switched over to connect the pipe 23 to the conduit 51.

Figure 2:
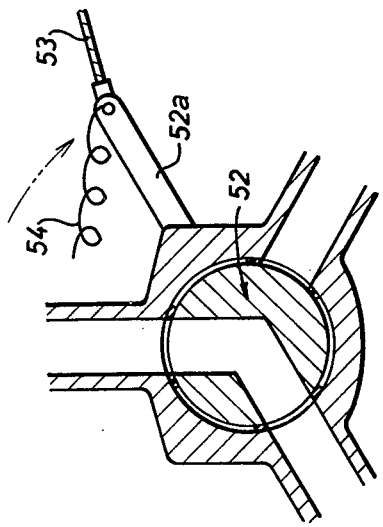
FIG. 2 is an enlarged view of the swing lever of FIG. 1, the swing lever being inoperative in the figure.
Figure 3:
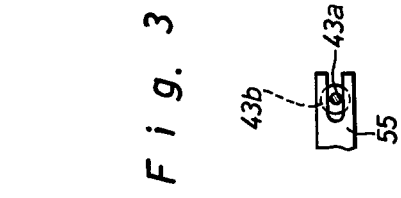
FIG. 3 is a cross-sectional view taken along line III—III of FIG. 2.
Figure 5:
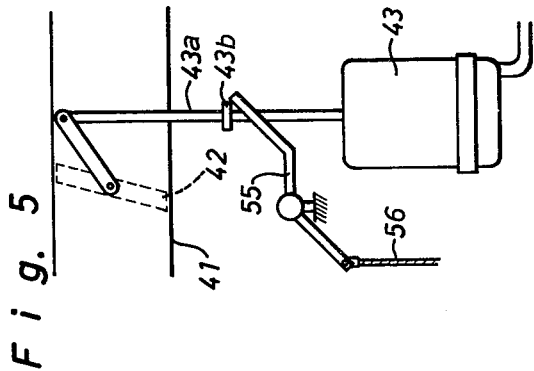
FIG. 5 is an enlarged view of the swing lever of FIG. 1, the swing lever being operated in the figure.

Furthermore, the pneumatic actuator 43 is provided with a swing lever 55 which is pivoted on a portion of the vehicle body structure. As shown in FIGS. 2 and 3, the swing lever 55 is engaged at 43b with a connecting rod 43a of the actuator 43 and is connected by a wire 56 to the manual shift lever 50. While the manual shift lever 50 is in the first position (I), the swing lever 55 is held in a position shown in FIG. 2 where the rod 43a of actuator 43 is permitted to freely move up and down regardless of the swing lever 55. When the manual shift lever 50 is shifted to the second position (II), the swing lever 55 is swung by the wire 56 to push up the rod 43a of the actuator 43, as shown in FIG. 5. Thus, the cut-off valve 42 is closed under inoperative condition of the actuator 43.

Figure 4:
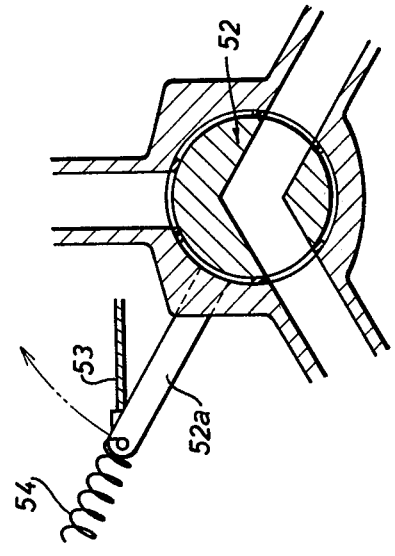
FIG. 4 is an enlarged cross-sectional view of the selector valve of FIG. 1, the selector valve being inoperative in the figure.
Figure 6:
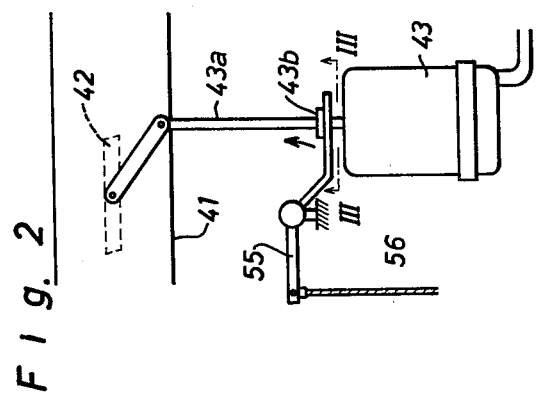
FIG. 6 is an enlarged cross-sectional view of the selector valve of FIG. 1, the selector valve being switched over in the figure.

While the vehicle is travelling, the air pump 34 is driven by the prime engine to charge the pressure tank 30 with compressed air through conduit 32 and check valve 33 so that the pressure in tank 30 rises over a predetermined value. When the manual shift lever 50 is held in the first position (I), the swing lever 55 is in the position of FIG. 2, and the selector valve 52 is also in the condition of FIG. 4 due to loading of the spring 54. Thus, the connecting pipe 23 opens toward the air inlet port 20c, and the valve body 22 is engaged at its first valve part 22a with the valve seat 22e to interrupt air flow from the air inlet port 20c into the pipe 23. Under the condition, the control and power pistons 21 and 24 are held in each retracted position of FIG. 1. Additionally, in the exhaust braking device 40, the selector valve 44 is inoperative due to opening of the switch 45 and the actuator 43 is deactivated to open the cut-off valve 42.

When the manual switch 45 is closed to effect the engine braking operating of the vehicle, the selector valve 44 is activated by electric energy of the battery E to apply the compressed air from tank 30 to the actuator 43 through conduits 31a and 31b. Then, the actuator 43 is operated by the compressed air to push up the rod 43a. This closes the cut-off valve 42 to block exhaust gases from the engine. Thus, the engine braking effect is rapidly increased by back pressure acting on the engine.

When the brake pedal 14 is depressed to produce braking pressure in the master cylinder 10, the braking pressure is applied to the wheel brake cylinders 11 across the operating piston 25 of brake booster 20, and simultaneously the control piston 21 is moved toward the air inlet port 20c due to the braking pressure applied thereto through the passage 20e. This closes the second valve seat 22c and opens the first valve seat 22e to communicate the air inlet port 20c to the connecting pipe 23. Then, the compressed air from tank 30 is supplied into the servo-chamber $R_1$ across the pipe 23 and selector valve 52. This moves the power piston 24 toward the operating piston 25 to close the check valve 27. After closure of the check valve 27, the braking pressure trapped in the chamber $R_2$ is increased by further movement of the operating piston 25 to ensure the braking operation of the vehicle.

If the pressure in tank 30 reduces below the predetermined value due to damages of the pump 34, the tank 30 or the like, the pressure switch 37 is activated to turn on the warning lamp 38. This alarms to the operator that the brake booster 20 and the exhaust braking device 40 may not be operated. In this instance, it is required that the manual shift lever 50 is emergently shifted to the second position (II) from the first position (I) to move up the swing lever 55. Upon moving of the swing lever 55, the rod 43a of actuator 43 is pushed up to close the cut-off valve 42, and simultaneously the selector valve 52 is switched over to connect the pipe 23 to the conduit 51. As a result, the back pressure in exhaust pipe 41 is applied to the servo-chamber $R_1$ through the conduit 51, the selector valve 52 and the pipe 23 so as to move the power piston 24 toward the operating piston 25. This closes the check valve 27 and moves the operating piston 25 to increase the braking pressure trapped in the chamber $R_2$. Thus, the braking operation of the vehicle is assured as same as that in the normal braking operation.

Figure 7:
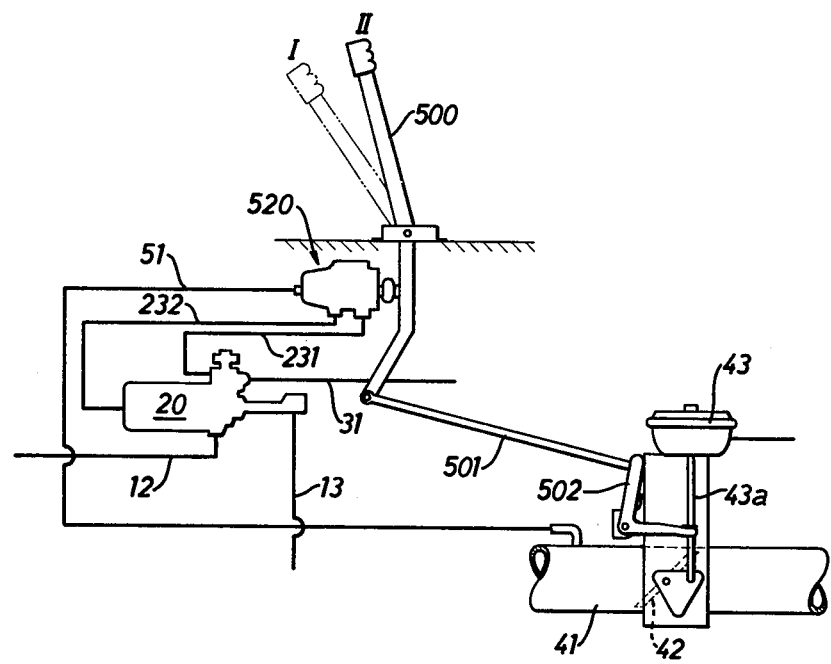
FIG. 7 is a schematic diagram of a modification of the present invention.
Figure 8:
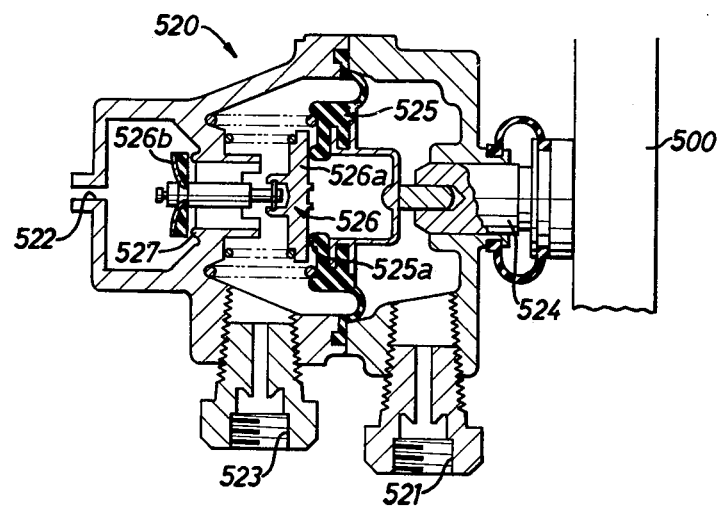
FIG. 8 is a sectional view of the selector valve of FIG. 7.

As shown in FIG. 7, the above-noted selector valve 52 may be replaced with a selector valve 520 which is arranged to be switched-over by movement of a manual shift lever 500. As shown in FIG. 8, the selector valve 520 is provided thereon with a first inlet port 521 for connection to a pipe 231, a second inlet port 522 for connection to the conduit 51 leading from the exhaust pipe 41, and an outlet port 523 for connection to a pipe 232. The pipe 231 is arranged to be connected to the air inlet port 20c of brake booster 20, and the pipe 232 is connected to the servo-chamber $R_1$ of brake booster 20. The selector valve 520 has a push piston 524 which is arranged to be moved inwardly by engagement with the manual shift lever 500 and is also connected with a spring loaded diaphragm 525. A spring loaded valve body 526 is provided integral with a first valve part 526a co-operating with a first annular valve seat 525a of the diaphragm 525 and a second valve part 526b co-operating with a second valve seat 527. Thus, the valve body 526 is normally separated at its first valve part 526a from the first valve seat 525a to provide intercommunication between the first inlet port 521 and the outlet port 523 and is engaged at its second valve part 526b with the second valve seat 527 to isolate the second inlet port 522 from the first inlet port 521 and the outlet port 523.

The manual shift lever 500 is located adjacent the operator's seat and is normally held in a first position in which the push piston 524 of selector valve 520 disengages from the shift lever 500. The manual shift lever 500 is also operatively connected to the cut-off valve 42 by way of a mechanical linkage including a connecting rod 501 and a bell-crank 502. When the shift lever 500 is shifted from the first position to a second position, the bell-crank 502 is swung by the connecting rod 501 to push up the rod 43a of the actuator 43, as shown in FIG. 5, and simultaneously the push piston 524 of selector valve 520 is moved inwardly by engagement with the shift lever 500 so that the valve body 529 is engaged at its first valve part 526a with the first valve seat 525a to isolate the first inlet port 521 from the outlet port 523 and is separated at its second valve part 526b from the second valve seat 527 to provide intercommunication between the second inlet port 522 and the outlet port 523, as shown in FIG. 8. This closes the cut-off valve 42 to create back pressure in the exhaust pipe 41 and communicates the pipe 232 with the conduit 51 to apply the back pressure from the exhaust pipe into the servo-chamber $R_1$ of brake booster 20. As a result, the power piston 24 is moved toward the operating piston 25 to close the check valve 27 and subsequently to move the operating piston 25 so as to increase the braking pressure trapped in the chamber $R_2$.

Although the above embodiment is adapted to the air-servo mechanism 20, it will be understood that the present invention may be adapted to a vacuum-servo mechanism. In this case, the air pump 34 and the actuator 43 are respectively replaced with a vacuum pump and a vacuum motor, and the pressure tank 30 is also replaced with a vacuum tank which is connected to a port 20d of the servo mechanism 20, the port 20c being communicated with the atmospheric pressure.

Having now fully set forth both structure and operation of preferred embodiments of the concept underlying the present invention, various other embodiments as well as certain variations and modifications of the embodiments herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. An emergency brake system for a vehicle having a brake booster to increase braking pressure applied to wheel brake cylinders from a master cylinder, said brake booster including a servo-chamber and a power piston operated by pneumatic pressure applied to said servo-chamber from a source of pneumatic pressure in response to operation of said master cylinder; the system comprising:
    a manual shift lever arranged to be normally held in a first position and emergently shifted to a second position from the first position;
    a cut-off valve provided within an exhaust pipe of an internal combustion engine for said vehicle and operatively connected to said shift lever, said cut-off valve being normally opened when said shift lever is in the first position and being closed upon shifting of said shift lever to the second position from the first position to create back pressure acting on said engine;
    a communication passage connecting said servo-chamber of said brake booster to an upstream of said cut-off valve; and
    a selector valve disposed within said communication passage to normally provide fluid communication between said pneumatic pressure source and said servo-chamber, said selector valve being switched-over upon shifting of said shift lever to the second position from the first position to apply the back pressure from said exhaust pipe into said servo-chamber through said communication passage.

2. An emergency brake system as claimed in claim 1, further comprising a pneumatically operated actuator arranged to be activated to close said cut-off valve when said shift lever is held in the first position, a second passage connecting said pneumatic pressure source to said actuator, and a second selector valve disposed within said second passage to normally close said second passage and being switched-over to apply the pneumatic pressure to said actuator from said pneumatic pressure source through said second passage to activate said actuator.

3. An emergency brake system as claimed in claim 2, wherein said second selector valve is an electrically operated valve which is connected to a source of electricity by way of a normally open switch, said valve being switched-over upon closing said switch to apply the pneumatic pressure to said actuator.

4. An emergency brake system as claimed in claim 1, wherein a mechanical linkage is provided to operatively connect said manual shift lever with said cut-off valve, and said selector valve is arranged to be switched-over by direct engagement with said mechanical linkage when said manual shift lever is shifted to the second position from the first position.

* * * * *